US011710427B2

(12) United States Patent
Bitton (10) Patent No.: US 11,710,427 B2
(45) Date of Patent: Jul. 25, 2023

(54) TANGIBLE CELLULAR STRUCTURE, ASSOCIATED METHOD

(71) Applicants: STUDIO B26, Paris (FR); Mikael Bitton, Paris (FR)

(72) Inventor: Mikael Bitton, Paris (FR)

(73) Assignees: STUDIO B26, Paris (FR); Mikael Bitton, Paris (FR)

( * ) Notice: Subject to any disclaimer, the term of this patent is extended or adjusted under 35 U.S.C. 154(b) by 0 days.

(21) Appl. No.: 17/254,655

(22) PCT Filed: Jun. 21, 2019

(86) PCT No.: PCT/EP2019/066500
§ 371 (c)(1),
(2) Date: Dec. 21, 2020

(87) PCT Pub. No.: WO2019/243589
PCT Pub. Date: Dec. 26, 2019

(65) Prior Publication Data
US 2021/0280100 A1    Sep. 9, 2021

(30) Foreign Application Priority Data

Jun. 22, 2018   (FR) ..................................... 18/00650

(51) Int. Cl.
*B33Y 80/00*    (2015.01)
*G09F 9/37*    (2006.01)
(Continued)

(52) U.S. Cl.
CPC .................. *G09F 9/37* (2013.01); *G09F 9/33* (2013.01); *G09F 19/02* (2013.01); *B29C 33/301* (2013.01); *B33Y 80/00* (2014.12)

(58) Field of Classification Search
CPC ... G09F 9/37; G09F 9/33; G09F 19/02; G09F 9/372; B29C 33/301; B29C 33/308; B33Y 80/00
See application file for complete search history.

(56) References Cited

U.S. PATENT DOCUMENTS 5,717,423 A  *  2/1998  Parker ..................... G06F 3/016
                                                434/114
2006/0044256 A1    3/2006  Carlberg
(Continued)

FOREIGN PATENT DOCUMENTS

CN    103207696 A    7/2013
CN    105096730 A    11/2015
(Continued)

OTHER PUBLICATIONS

International Search Report as issued in International Patent Application No. PCT/EP2019/066500, dated Sep. 9, 2019.
(Continued)

*Primary Examiner* — Rick K Chang
(74) *Attorney, Agent, or Firm* — Pillsbury Winthrop Shaw Pittman LLP (57) ABSTRACT

A tangible structure includes a set of removable and parallel rods, each rod including a head; a set of drive devices, each drive device including a motor element generating a rotational motion to a transverse shaft to transmit a translational motion to a rod, the drive device being piloted in order to transmit a motion to the rod at a given speed and in a given direction; a holding system for the drive devices making the drive devices integral with each other, and a calculator determining a set of pilot set points, each pilot set point being transmitted to a drive device on the basis of a first digital set point.

13 Claims, 8 Drawing Sheets

(51) Int. Cl.
　　　*G09F 9/33*　　　(2006.01)
　　　*G09F 19/02*　　　(2006.01)
　　　*B29C 33/30*　　　(2006.01)

(56) References Cited

U.S. PATENT DOCUMENTS

| | | |
|---|---|---|
| 2015/0248960 A1 | 9/2015 | Khan et al. |
| 2016/0133203 A1 | 5/2016 | Jurewicz et al. |

FOREIGN PATENT DOCUMENTS

| | | |
|---|---|---|
| CN | 105856562 A | 8/2016 |
| CN | 106926442 A | 7/2017 |
| CN | 207119826 U | 3/2018 |
| EP | 2 873 514 A1 | 5/2015 |
| GB | 2 470 981 A | 12/2010 |

OTHER PUBLICATIONS

First Office Action as issued in Chinese Patent Application No. 201980052333.X, dated March 1, 2022.

* cited by examiner

TANGIBLE CELLULAR STRUCTURE, ASSOCIATED METHOD

CROSS-REFERENCE TO RELATED APPLICATIONS

This application is the U.S. National Stage of PCT/EP2019/066500, filed Jun. 21, 2019, which in turn claims priority to French patent application number 18/00650 filed Jun. 22, 2018. The content of these applications are incorporated herein by reference in their entireties.

FIELD

The field of invention relates to three-dimensional movable structures especially for animating physical surfaces for displaying interactive images. More particularly, the field of invention relates to so-called "tangible" surfaces. The field of the invention finds applications especially in the production of animated advertising media and any types of surfaces whose three-dimensional geometry can be associated with information to be broadcast.

STATE OF THE ART

Currently, tangible surfaces exist and are preferentially made to provide display of interactive content to the user allowing him/her to enjoy a three-dimensional representation of a two dimension-defined content. Tangible displays enable a new experience to be defined, and can be used for many applications such as advertising media.

Known solutions are often complex, as described by the inFORM solution developed by MIT, which discloses a solution in which the animation of the tangible surface is achieved by individually actuating different elements.

Patent application US2016/0133203 published on May 12, 2016 is also known, which describes a tangible structure for making interactive advertising media.

The drawback of these solutions is the implementation of motor and actuation means individually to animate each removable element. These devices are complex and often require making structures on a case-by-case basis for unique applications.

The energy required and complexity of the motor architecture to be implemented impose structures limiting the number of motor elements. In addition, dimensions of the elements of existing solutions prevent tangible structure type solutions from being miniaturized. There are therefore limits to forming tangible surfaces that correspond to complex, high definition images.

Therefore, there is a need for defining a new solution that can be miniaturized and whose control system allows the activation of positioning each removable element individually promoting installation of a large number of these removable elements.

SUMMARY OF THE INVENTION

According to a first aspect, the invention relates to a tangible structure comprising:

a set of movable and parallel rods, each rod including a head;

a set of drive devices, each drive device including a motor element generating a rotational motion to a transverse shaft to transmit a translational motion to a rod, said drive device being piloted to transmit motion to the rod at a given speed and in a given direction;

a system for holding the drive devices, making said drive devices integral with each other;

a calculator determining a set of pilot set points, each pilot set point being transmitted to a drive device from a first digital set point.

One advantage is to simply build structures allowing a movable interface to be defined by actuating a plurality of rods that can be independently controlled according to a given digital set point.

By "movable rod" or indifferently a "removable rod", it is meant a rod that moves. Preferentially, the movement of the rod is limited in degree of freedom so that it is limited to a longitudinal movement. This longitudinal movement can be performed in both senses of a given direction.

According to one embodiment, the holding system is a plate including a plurality of openings, each opening allowing a rod to pass therethrough. One advantage is to achieve holding of all the frames/cells in which the drive devices are arranged. Another advantage is to allow the definition of guides extending from the openings. The plates enable the structure of the invention to be made compact.

According to one embodiment, the drive devices are direct current gear motors. One advantage is the simplicity and cost of the solution.

According to one embodiment, each drive device comprises a pressure element driven by the motor element which in turn drives a rod by friction. One advantage is a gain in controlling the rod motion. Mechanical rotations make it possible to define motions that are faithful to the set points. In addition, the parts can be easily changed individually. According to one embodiment, each pressure element is a roller. One advantage is an increased simplicity in implementing the solution.

According to one embodiment, each drive device comprises a bevel gear system including two gear wheels for transmitting rotation of the drive shaft to rotation of a transverse shaft, said rotation of the transverse shaft causing rotation of the roller, said roller being secured to the transverse shaft. One advantage is that it is possible to configure a desired speed reducing ratio. In addition, the robustness of such a gear ensures low failure rate.

According to one embodiment, the rods are made of a polymeric material. One advantage is to define a light, low-cost and low-consumption solution. Another advantage is to define a solution improving friction with a roller in order to achieve accurate movements of each rod.

According to one embodiment, each drive device is integrated into a substantially parallelepipedal shaped frame including two guides each including an opening adapted to receive a rod in order to direct translational motions of a rod, said rod passing through said frame. One advantage is to protect the solution and improve robustness of the structure.

According to one embodiment, the drive devices are arranged so that they each have at least one side face in contact with an adjacent side face of another frame. One advantage is to improve mechanical rigidity of the structure and to avoid clearance between parts.

According to one embodiment, the rods are provided at their ends with an elastic head made of a material including: {elastomer, polymer, resin}. One advantage is that it does not damage/attack a surface to be deformed.

According to one embodiment, the tangible structure comprises a deformable surface whose deformation is driven by the rods, each head of which is in contact with said surface. One advantage is to allow surface deformation for various applications.

According to one embodiment, each rod has a cross-sectional area between 1 mm$^2$ and 1 m$^2$. One advantage is to define solutions for different applications.

According to one embodiment, the tangible structure includes a second guide plate including a plurality of openings and parallel to the first plate and spaced by a predefined distance to keep the drive devices in a sandwich, said second plate being arranged so that each rod passes through both plates. One advantage is to enhance robustness of the solution. According to one embodiment, the first and/or the second plate are formed in a matrix defining the cells/frames of each drive device.

According to one embodiment, the tangible structure comprises a plurality of light sources, said sources being controlled by a light set point, each one being arranged:

at one end of a rod head, or;
in a thickness of the deformable surface.

One advantage is to allow the definition of interactive screens. One advantage is to make a number of rods correspond to a number of pixels of an image.

According to one embodiment, the rod head includes a group of LEDs, each LED being individually or collectively pilotable. A piece of data relating to the property of a color can be employed to pilot kinematics of the rods Ti. Together or alternately, a depth piece of data can be employed. According to one embodiment, a contour piece of data calculated from a shape, contour or contrast detection algorithm is used to pilot the stroke of a rod Ti.

One advantage is to provide a plurality of combinations of parameters in order to pilot differently the tangible structure. By way of example, the color of each LED of a cell can be individually piloted while piloting the stroke of a rod from a complementary parameter such as shape, contour or depth piece of data.

According to one embodiment, the tangible structure includes a heating source and a means for activating heat to be applied to a material arranged in contact with the ends of the rods. One advantage is to allow complex surfaces to be made especially for medical uses.

According to one embodiment, the first digital set point is:

at least one digital piece of data;
pixel values of a digital image and/or a pixel distribution of said image;
digital information including text and/or numbers.

One advantage is to allow the tangible structure to be coupled with any source of digital data to create utility media especially for a citizen of a city undergoing modernization.

According to one embodiment, the calculator coordinates generation of the pilot set point with generation of the light set point from a same first digital set point. One advantage is that the tangible structure can be coupled with any digital image source to generate interactive visual effects.

According to another aspect, the invention relates to a method for manufacturing a three-dimensional object including the steps of:

positioning and holding a thermosetting material on a structure of the invention;
activating the tangible structure by means of a rod pilot set point in order to form a three-dimensional shape deforming the thermosetting material held at the end of each rod;
activating a heating source for heating the thermosetting material beyond a predefined temperature threshold allowing the thermosetting material to polymerize;
cooling and removing the material.

One advantage is a simple manufacturing by virtue of the definition of a shape defined by the motion of the rods. One advantage is the ability to make complex surfaces.

According to another aspect, the invention relates to a method for generating a three-dimensional shape by activating a plurality of rods of a tangible structure, said rods being arranged in parallel to each other, said method including the following steps of:

receiving an image;
calculating a plurality of stroke indicators for a plurality of sets of image pixels, each stroke indicator being calculated for a given rod of the structure depending on the properties of each set of pixels;
guiding the set of rods by means of each drive device, said drive devices each generating a motor set point from a pilot set point (Cpil) derived from the stroke indicators.

One advantage is to make facades or advertising media with a visually attractive power.

According to one embodiment, receiving an image is carried out by a communication interface or a memory of the structure; the set of pixels associated with a rod includes a single pixel and guiding is carried out at a constant speed. One advantage is to be compatible with a large number of equipment. Control can be generated by a remote equipment. Thus, the structure can be remotely piloted.

According to one embodiment, each pilot set point further generates an electrical set point each piloting a light source arranged at the end of each rod and activating a property of the light emitted by each of them.

According to another aspect, the invention relates to a computer program product including a calculator and a memory for the implementation of the steps of the method of the invention. Further, the invention relates to a medium comprising a memory including software instructions which, when executed, make it possible to carry out the steps of the method.

BRIEF DESCRIPTION OF THE FIGURES

Further characteristics and advantages of the invention will be apparent from the following detailed description, with reference to the appended figures, which illustrate.

DESCRIPTION

By "Tangible structure", it is meant in the following description a structure the geometry of which can be modified from a digital or electrical command to form a three-dimensional shape, especially for the purpose of broadcasting information such as an image.

Figures 1, 2, 3:
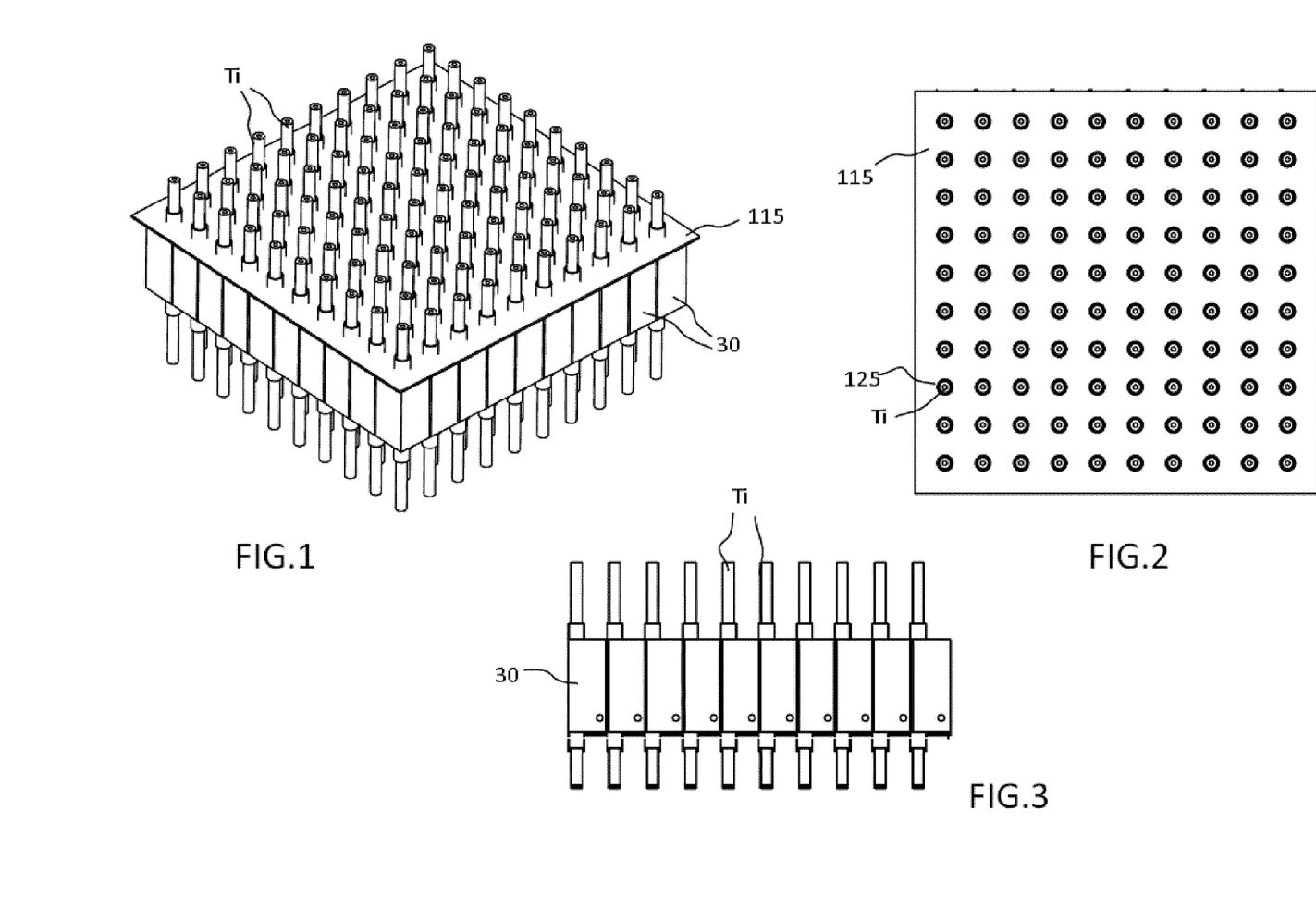
FIG. 1: a perspective view of one embodiment of a structure of the invention in which the rods translationally move.
FIG. 2: a top view of one embodiment of a structure of the invention including a hundred rods.
FIG. 3: a profile view of one embodiment of a structure of the invention.
Figure 8:
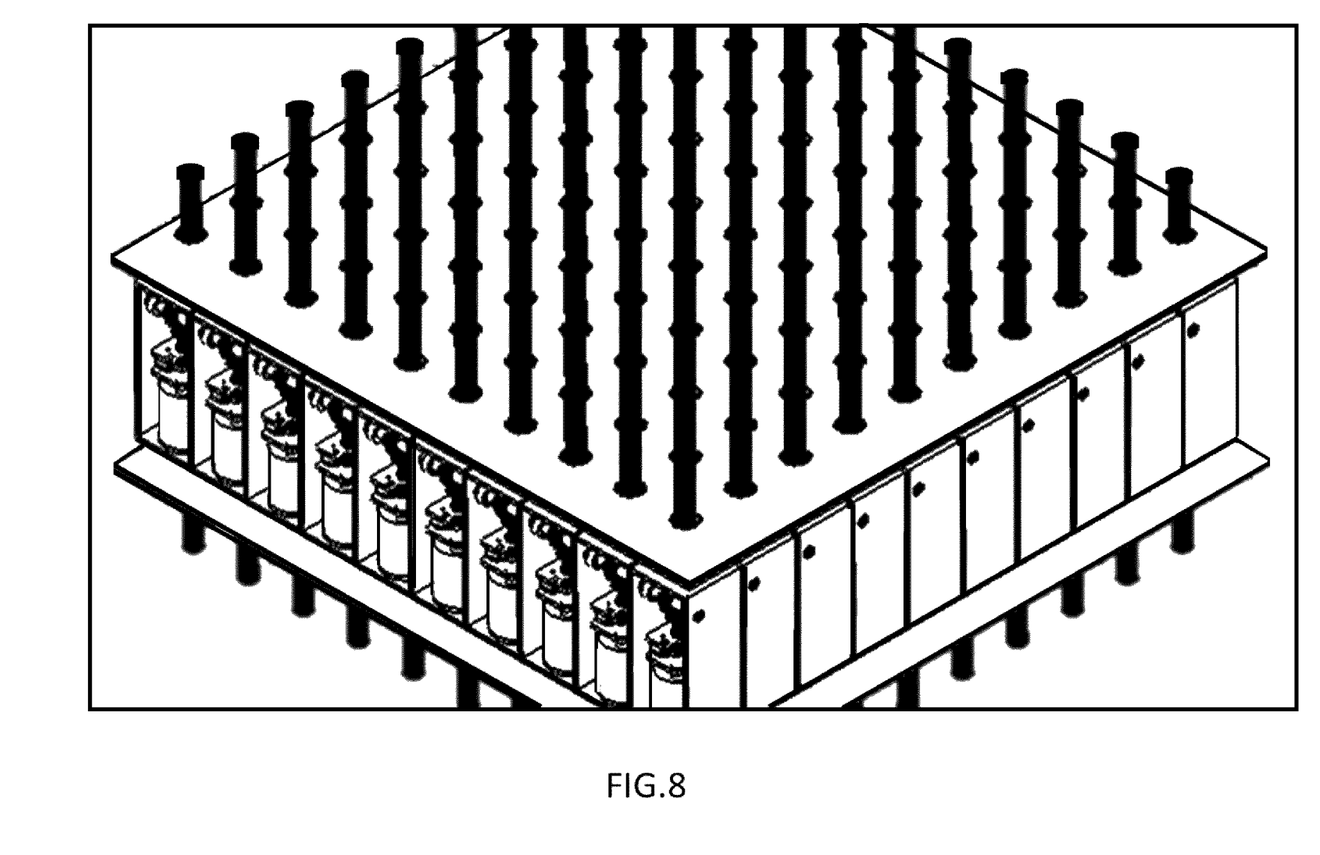
FIG. 8: a perspective view of one embodiment of a structure of the invention including two holding plates.

FIG. 1 represents one embodiment of a tangible structure of the invention including a plurality of removable rods Ti arranged in parallel to each other. The rods Ti are moved by virtue of a plurality of drive devices 30, each forming an autonomous cell. According to one embodiment, each cell is dedicated to the movement of a single rod Ti. The movement of a rod Ti is animated according to a longitudinal motion generated by virtue of a motor element of a drive device. According to one embodiment, a rod holding system comprises at least one plate for guiding the rods during their movement, especially by virtue of a plurality of openings. In the case of FIGS. 1 and 2, the holding system includes a plate 115 including through openings for the rods Ti to pass therethrough. In the case of FIG. 8, the holding system comprises two parallel plates 115, 116 defining an intermediate space in which the drive devices are embedded. The rods Ti thereby have a degree of freedom according to a translational motion. In this way, the parallelism of the rods Ti between them is maintained.

According to one embodiment, plate(s) 115 and/or 116 can be added to be superimposed with the drive devices 30. According to another example, plate(s) 115, 116 can be directly made within the same frame as the frames 35 defining the cells of the drive devices 30. For example, this can be the case when the frames 35 are made within the same molded or thermoformed part or machined from a 3D printer. In the latter case, the matrix forms on its lower and/or upper part a plane that provides function of a holding plate 115 and/or 116. In the latter case, the upper and/or lower plane forming the plates is drilled in such a way as to leave the translational motions of the rods free. A tubular guide, for example of the same material as the matrix, can extend from each opening.

FIG. 3 represents a side view of one embodiment of structure 1 of the invention. Each rod Ti translationally moves within a cell.

According to one embodiment, each drive device 30 of the invention comprises a frame 35 adapted to the application contemplated. The frame 35 is for protecting electrical and mechanical equipment against shocks. It can be designed to be watertight to prevent water infiltration therein. This is particularly interesting in the scope of outdoors applications of the tangible structure 1. Further, the frame allows better rigidification of the structure. Indeed, when the walls of the frames of two drive devices cooperate with each other, the structure is reinforced.

One advantage of an arrangement as represented in FIG. 3 of the invention with the drive devices 30 is to reinforce the structure, gain space and reduce the overall clearance.

Frame 35, forming a casing, also acts both as bearings for the axis and as a guide for the rod Ti.

According to one embodiment, guides forming bearings extend from each frame 35. According to one embodiment, a first guide 36 extends from the upper part of frame 35 and a second guide 36' extends from the lower part of frame 35. The guides can form, according to one exemplary embodiment, a tubular portion in which a rod Ti translationally moves. The guides can have a length from a few millimeters to several centimeters.

According to one exemplary embodiment, the cells are all manufactured as a single piece, for example a plastic or elastomer defining a matrix in which a plurality of frames 35 are arranged next to each other. The matrix can be thermoformed and/or molded.

Figure 6:
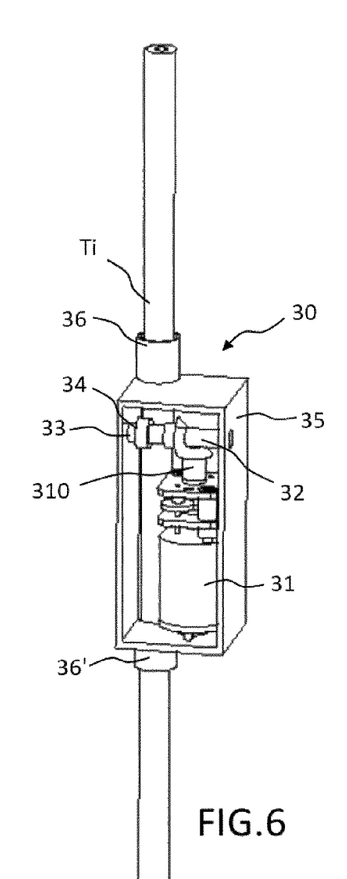
FIG. 6: one embodiment of a system for driving a structure of the invention in a perspective view.

FIG. 6 represents a drive device 30 including a motor 31, such as a gear motor. Motor 31 is used to rotate a motor shaft 310. The motor shaft 310 is rotatably driven according to a pilot set point Cpil which allows for example a rotation speed and a rotation duration to be defined. The motor shaft 310 drives a transverse shaft 33 by virtue of a gear system 32.

According to one exemplary embodiment, the motion is generated by a direct current gear motor 31 the output shaft 310 of which transmits the rotational motion to an intersecting axis 33 relative to the motor shaft. Preferably, this axis is a transverse axis 33 perpendicular to the axis of the motor shaft 310.

According to one example, the transverse shaft 33 drives a plastic/polymer pressure roller. The friction pressure roller performs friction drive for the rod Ti. According to one embodiment, the pressure force can be provided by an assistance device in order to limit forces to be applied by the motor. Further, the pressure force can be assisted by at least one spring. In one example, two small tension springs (not represented) taken from the roller axis, for example on either side of the roller, are used to enhance the pressure force thereof.

According to one exemplary embodiment, the transmission of rotation from the motor shaft 310 to the transverse shaft is done by means of a bevel gear system: two bevel gears, one connected to the motor shaft and the other connected to the axis. The rotation of the axis enables the roller 34 to be moved, which roller transmits the rotational motion and transforms it by friction with the rod Ti into a linear motion.

Rods

The rods are preferably made of a plastic material, such as polycarbonate or polypropylene. According to one embodiment, they have a diameter between 1 mm and a few cm. According to one embodiment, the diameter of the rods is preferentially between 1 mm and 1 cm. In one exemplary embodiment, the diameter is 5 mm.

According to different embodiments, the length of the rods Ti depends on the case of application. For small surface areas and tactile applications, the rods Ti can have a length of a few millimeters to several centimeters. According to applications for example in urban environments to provide surfaces for buildings or advertising, the rods Ti can have a length of a few centimeters to several meters.

In other embodiments, the rods are constructed of a metal material such as aluminum, iron, steel, etc. As an example, rods Ti of quenched stainless steel with a nominal diameter of M5.2 allow good resolution to be obtained while keeping good bending strength due to axial forces.

Tip

Figure 12:
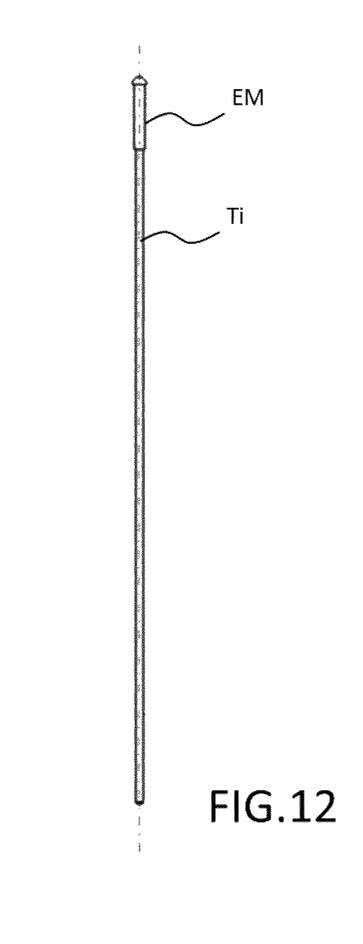
FIG. 12: one embodiment of a rod including a tip according to one embodiment of the invention.

According to one embodiment, each rod Ti is provided with a tip EM, for example, comprised of an elastomeric, polymeric or resin material. The tip is attached to a rod Ti by clamping or molding or by a method of transforming a thermosetting material. According to one embodiment, the tips form sheaths that are positioned at the end of each rod Ti.

When the rod itself is made of a plastic material, its end can be used as a tip.

According to one embodiment, the inside of the tip EM is threaded, which makes it possible, for example, to ensure a better hold of the tip on a threaded rod. For example, the rod can be threaded on an end portion of the rod.

According to one embodiment, the tips EM forming the heads of the rods Ti each have a hemispherical end, for example of rubber. The hemispherical shape and the material of the tip allow especially the deformable viewing interface to be deformed when in use, without damaging it.

According to one embodiment, the tip EM includes a light source arranged at the internal end of the tip EM. An LED or OLED type diode can be used therefor. When a light source is inserted inside the tip EM, a wired connection can be connected to the rod Ti so that it can supply the diodes with current. For this purpose, conductive rods Ti can be used to convey charges from a power source, for example arranged within the frame of the drive device or in contact with one of the plates 115, 116.

According to one example, the light source disposed at the end of each rod Ti head includes a set of LEDs. These can be combined with an elastic head having a polymeric material. However, according to another example, each rod Ti can be provided with a light source not combined with an elastic head.

In the embodiment where an EM head of a rod Ti includes a plurality of LEDs, the set of LEDs that forms the light source of the rod Ti is called a "cell".

According to a terminology in the field of tangible structures, such a cell can also be called a "Voxel". In the latter case, the term "Voxel" refers to the construction of a volumetric pixel by generating an optical effect for the observer due to the mobility of the rods and relative strokes of each rod. The voxel can be formed by a cell including a single LED or a plurality of LEDs.

In one exemplary embodiment, a light source arranged at the tip EM of a rod Ti can have 25×25 mm dimensions comprising 16 pixels RGB LEDs. Said LEDs are, for example, simultaneously piloted. Set points are emitted in order to achieve a joint movement of a plurality of rods Ti. This piloting allows a dynamic effect associated with image production to be achieved. This dynamic effect generates a three-dimensional visual effect for the observer. The rods Ti are, for example, animated with an amplitude of motion from a neutral position to a deployed position that can range up to 260 mm. The stroke length can be adapted depending on the configuration of the holding means, for example, by adding cut out plates or by separating them by a sufficient distance to produce longer strokes.

FIG. 12 represents one exemplary embodiment in which the tips extend over a length in the order of 5% to 15% the size of the rods Ti.

Driving Means

The rods Ti are longitudinally moved by virtue of the drive devices 30.

Figure 4:
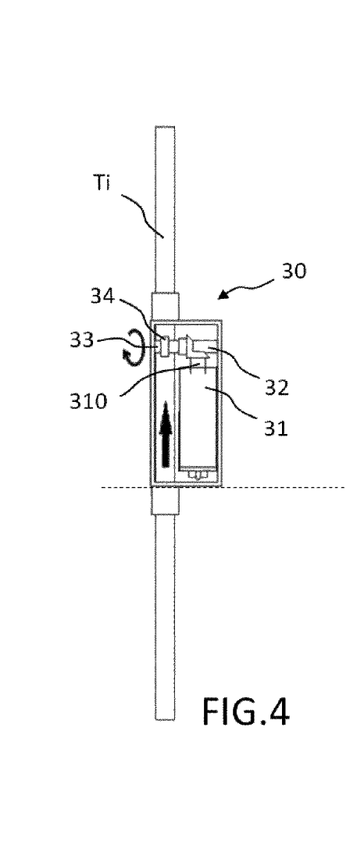
FIGS. 4 and 5: one embodiment of a system for driving a structure of the invention into two positions of a rod translationally moved.
Figure 5:
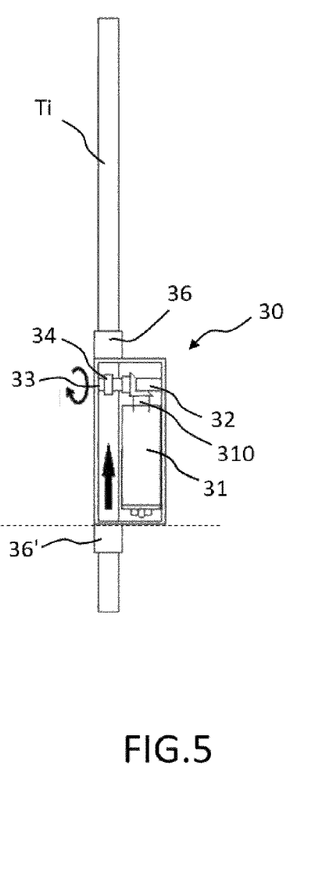

FIGS. 4 and 5 represent a rod longitudinally moving within a drive device 30. The maximum stroke of a rod is limited to the dimensions of said rod Ti.

Motor

According to one embodiment, a drive means includes a motor 31. FIG. 6 represents one exemplary embodiment of a motor 31 arranged within the frame 35 of a drive device 30. Motor 6 is powered by a power source not represented. According to one embodiment, a single power source can be used to power all the motors 31 of each drive device 30. Each motor 31 rotatably drives a motor shaft 310. The motor shaft 310 is configured to drive a transmission device, for example, including gears. According to one embodiment, the rotation is transmitted by means of a bevel gear system. This consists of two bevel gears, one of which is connected to the drive shaft 310 and the other to the transverse axis 33.

Figure 7:
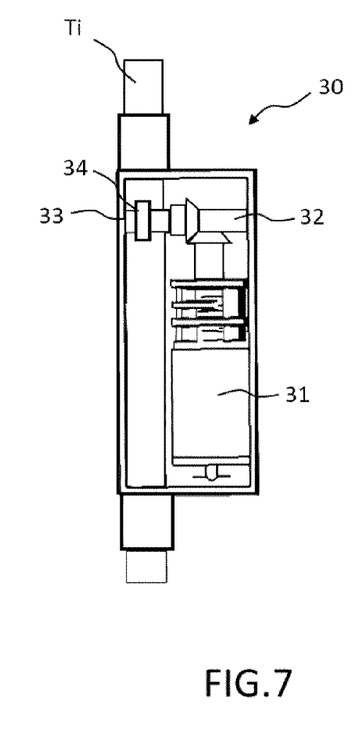
FIG. 7: one embodiment of a system for driving a structure of the invention in a front view.

FIG. 7 represents a front view of the perspective view of FIG. 6.

According to one exemplary embodiment, motor 31 of each drive device 30 is a stepper motor with a torque above a predefined threshold. According to one example, motors 31 are direct current gear motors.

According to one exemplary embodiment, a damping device can also be arranged to limit the speed of movement of the rods when the translation of a rod comes to a stop within the rod stroke Ti.

Plate

According to one embodiment, plate 115 or 116 is planar. According to one embodiment, plate 115 and/or 116 includes through openings for guiding the rods Ti.

The presence of one or more plates 115, 116 avoids especially the introduction of a mechanical clearance that can cause a force deforming the rods.

Parallel Plates

According to one embodiment, the clutch system 2 of the invention includes two parallel plates 115, 116 including through openings to allow the rods to pass therethrough. The plates make it possible to hold some elements and ensure guiding function for the rods Ti. Plates 115 and 116 thus prevent the rods Ti from bending under their own weight.

According to one exemplary embodiment, a gear motor 31, such as a direct current motor, is associated with a transverse shaft to rotatably drive a cam or a roller 34.

Plate 115 can be drilled to allow the rods Ti to pass therethrough. The gear motor 31 can be activated from the pilot set point Cpil. The activation of the gear motor 31 allows to control rotation of the motor shaft 310 and thus, in fine, the roller 34. The rotation of roller 34, or of a cam, can be configured to cause a rod Ti to move by friction. In this case, friction roller 34 carries out friction drive for the rod Ti. According to one alternative, springs can be used. The pressure force will be less disturbing with two small tension springs (not represented). Further, forces applied to each spring can be reduced.

The space requirement can be optimized so that the drive devices 30 abut between two holding plates 115 and 116. In order to optimize space requirement, the drive devices 30 can be arranged in contact with each other, for example with one or more of their planar side surfaces.

Within a drive device, the arrangement of the gear motor 31, motor shaft 310, gear system and transverse shaft 33 and roller 34 allows the entire unit to be confined in a reduced minimum amount of space. The dimensions of shafts 310 and 33 and the power of gear motor 31 can be size matched to the rod Ti to be driven.

FIG. 2 represents a top view of one embodiment of a plate 115 of the structure of the invention. The rods Ti are arranged so as to form a matrix including rows and columns of rods Ti. The rods Ti are translationally moved in openings 125 of plate 115. The diameter of opening 125 is adjusted to the diameter of the rods. One advantage is to be able to easily transpose an input image shapes of which are desired to be reproduced to all the rods Ti.

Figure 13:
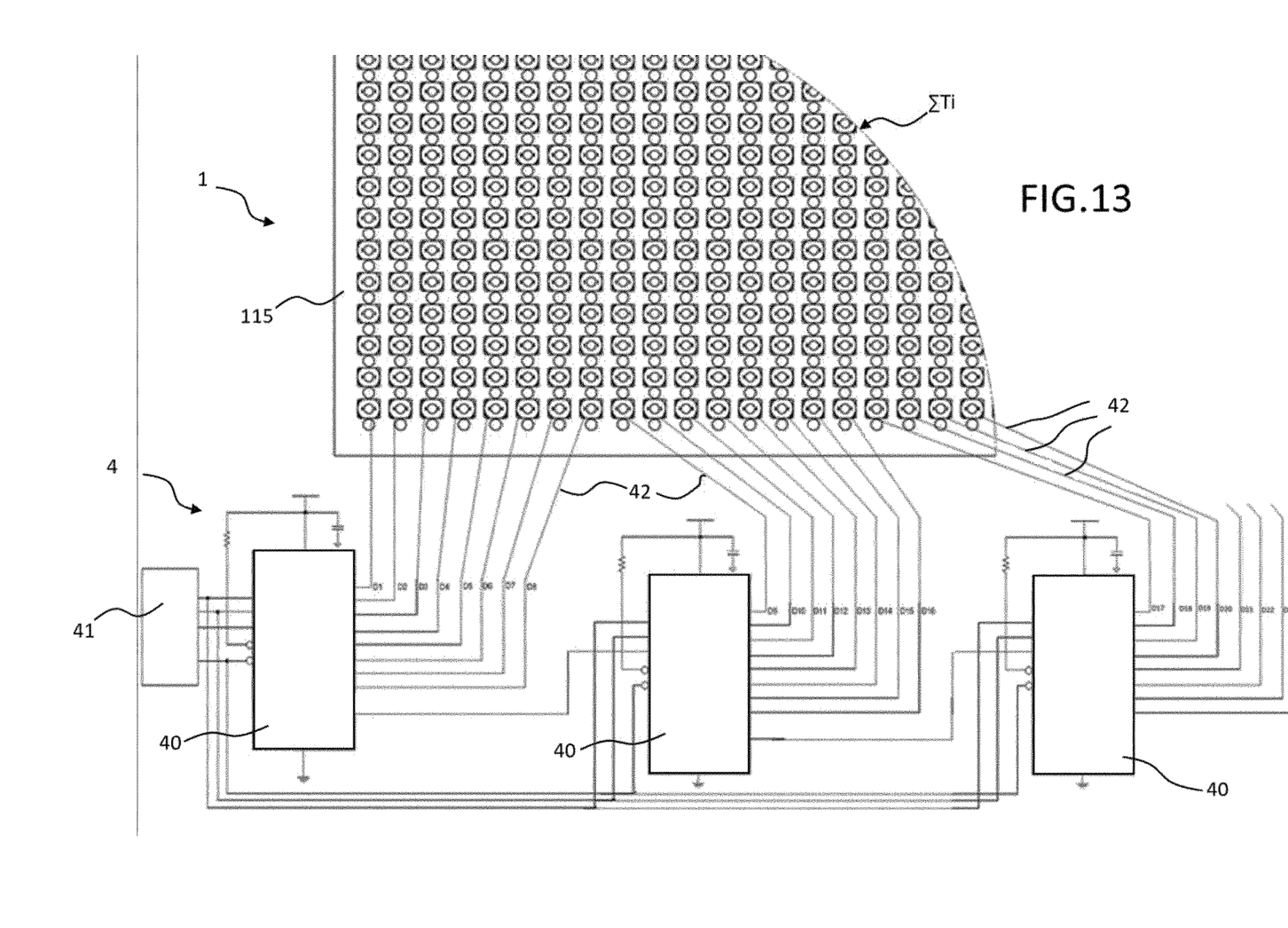
FIG. 13: a top view of one embodiment of a structure of the invention including a calculator and electronic modules activating the drive devices.

According to one example, registers each control a plurality of rods Ti. FIG. 13 illustrates an example of an electrical connection allowing the rods to be piloted by means of registers 40. The registers 40 are thereby electrically connected to each gear motor co-located with a rod with which it is associated.

To this end, the electrical control is generated according to a given programming including information relating to time information.

Shift registers can be used for the electronic control of the gear motors 31 by generating a control current. In this case, one register can control one or more gear motors 31 depending on their configuration. According to one embodiment, shift registers used are 8-bit integrated circuits, that is each register can control 8 gear motors 31.

A plurality of electrical commands can then be generated at time instants determined by a calculator according to a given pilot set point Cpil. The electrical set point can include for each gear motor 31 a duration in which it actuates the motor. The speed of motor 31 and the direction of rotation of motor shaft 310 are then determined by the electrical set point C1.

Other configurations are contemplatable, e.g. to control a larger number of gear motors 31 from another electronic board with a larger number of integrated circuits.

According to one embodiment, a system for controlling and piloting the gear motors 31 can be provided by an electronic component. According to one exemplary embodiment, H-bridges are used for piloting the motors 31. The components can be used to rotatably activate direct current motors. By way of example, a single component L293d forms two H-bridges, which allows two separate motors to be piloted in both directions and independently of each other.

According to one embodiment, all the components piloting the motors are arranged in PCBs allowing them to be connected to each of the motors 31. According to one embodiment, all the components are controlled by a microcontroller and a computer.

According to one embodiment, the implementation of an electronic board to for providing different more general functions can be used. For example, the board providing a first function used for the power supply of the different elements of structure 1 can be used. Especially, a voltage regulation to generate a given motor speed or a value of the light set point of a possible diode located at the end of a rod, or even an electrical set point aiming at heating an electrical resistor at the end of each rod can be provided by this electronic board.

According to one example, a printed circuit board (PCB), allows a computing, individual and independent control for each rod Ti.

Three-Dimensional Image Generation

According to one embodiment, structure 1 of the invention makes it possible to generate a three-dimensional image by controlling color and luminous intensity of each light source at the end of each rod Ti. In addition, the control of the lightness of the diodes can be carried out together with the control of the stroke of each rod Ti, especially by virtue of the same input pilot command.

According to one example, controlling a colorimetric parameter such as lightness, contrast, hue, saturation or sharpness or a combination of these parameters is made individually for each light source and possibly for each elementary source making up the light source of a rod Ti head, such as a LED of a cell.

Figure 9:
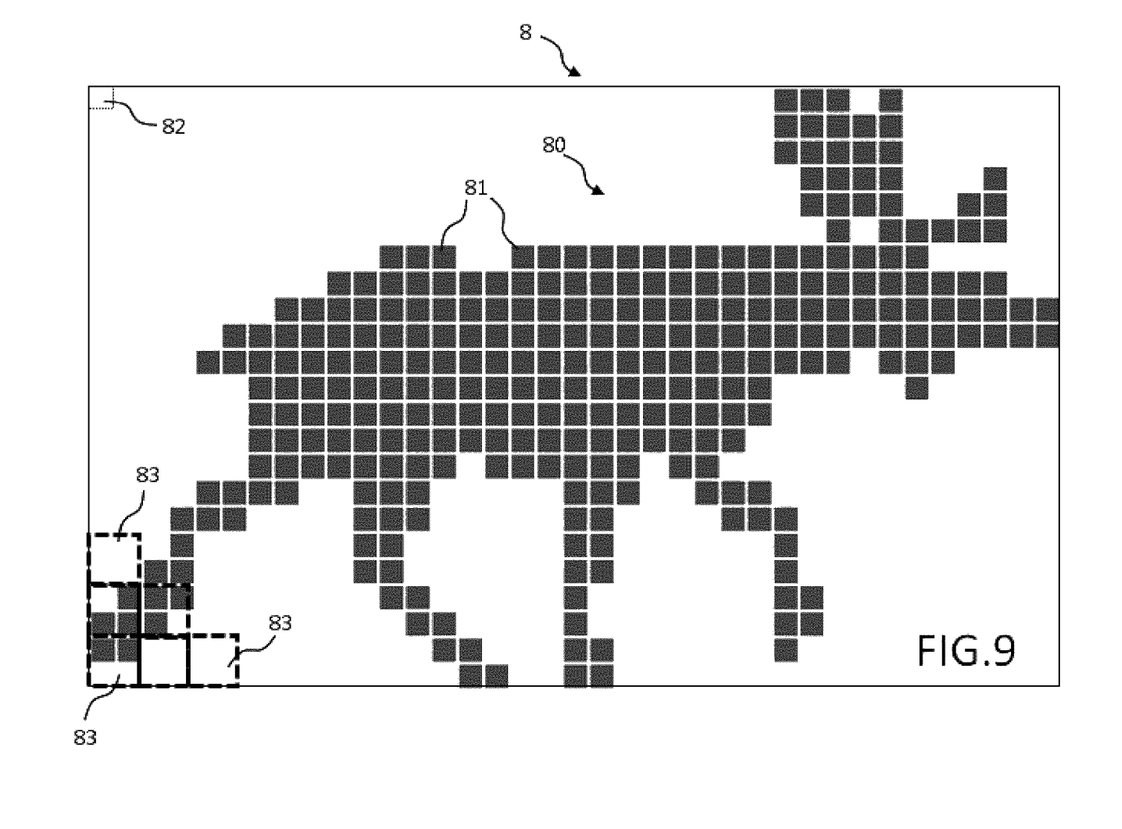
FIG. 9: a pixelized image that can define a reference image in order to activate the structure according to one embodiment of the invention.

FIG. 9 shows an image 8 including a plurality of pixels 81, 82 which represents in this example a black and white drawing 80 of a deer with 38×23 pixels. The invention is concerned with any type of image, regardless of its format, resolution or the number of colors applied to the image.

In this example, a particular configuration of the structure makes it possible to assign a number of rods to a given number of pixels. A first configuration allows a pixel to be assigned to a rod. The movement of each rod Ti thus corresponds to the representation of a pixel.

In the case of FIG. 9, each rod Ti of structure 1 is driven according to a pilot set point addressed to each drive device in order to reproduce patterns of image 9.

According to one example, if the rods are all in a default position, the motors of each drive device 30 drive the set of the rods Ti in a direction Di with a stroke that can be parameterized according to the pixel value.

The rods Ti corresponding to the black color pixels are driven over a given distance so as to form the three-dimensional image 80 representative of a deer. The stroke of the corresponding rods can correspond, for example, to the maximum stroke, that is 100% of the total stroke of the rod Ti. The other rods Ti corresponding to the white pixels 82 are either held at their default position or driven to a maximum foldback position, or 0% of the possible positive stroke. Thus, structure 1 allows all the rods Ti to be animated to form a three-dimensional image.

According to another configuration, each rod Ti can correspond to a set of pixels. In the case of FIG. 9, each rod Ti could be associated to 4 pixels forming a square, for example like the squares 83 represented at the bottom of the image. Rules can be defined for example when pixels of different colors are in the same square 83. By way of example, if 3 black pixels are in a group 83 of 4 pixels associated to a rod Ti, the rod Ti can be considered as a black pixel and have a maximum stroke of 100% of the possible stroke. Alternatively, a stroke of a length in proportion to the number of pixels can be performed. In the case of 3 black pixels, the rod Ti would have a stroke of 75% of the maximum possible stroke. In case two black pixels would be present in a group 83 of 4 pixels, a stroke of 50% of the total possible stroke could be programmed. In the case of a single black pixel present in a group 83 of 4 pixels associated with a rod, a stroke of 25% of the total possible stroke could be programmed.

Figure 14A:
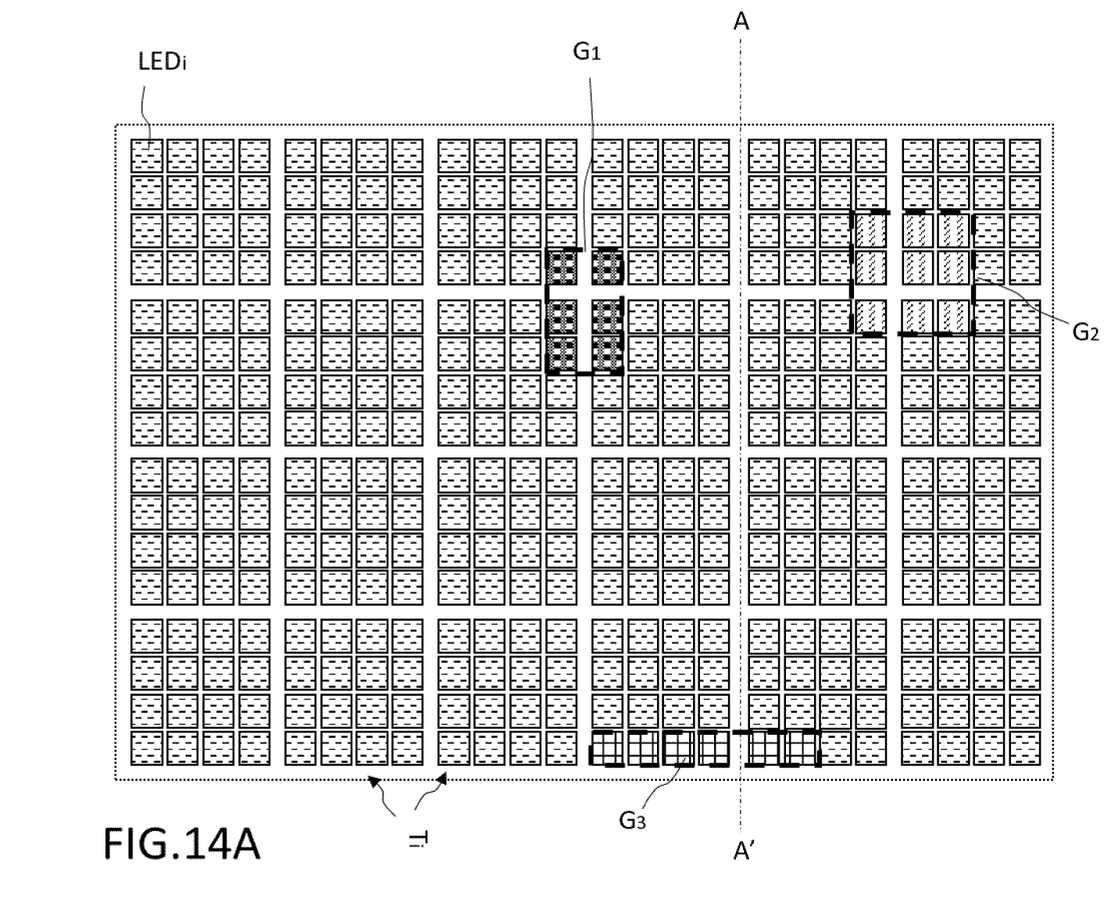
FIG. 14A: a top view of one embodiment of a portion of the tangible surface on which LED matrices are represented.
Figure 14B:
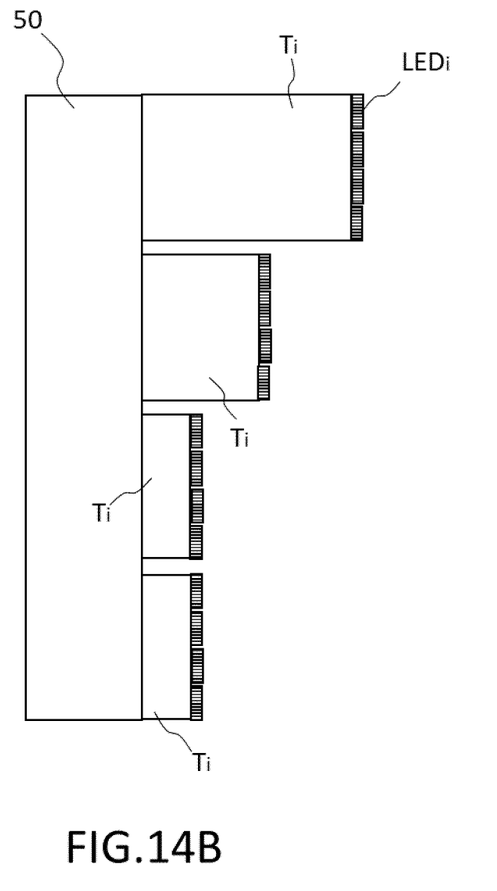
FIG. 14B: a cross-section view of a tangible screen from FIG. 14A representing a portion of four rods equipped with LEDs with different strokes.

FIGS. 14A and 14B represent a portion of a tangible screen of the invention. This portion illustrates 24 rods Ti each including a head. In this example, each head includes a light source, that is a light cell including a plurality of diodes such as LEDs. Here a matrix of 4×4, or 16 LEDs allow the light cell arranged at the head of each rod Ti to be formed. In other words, each light cell of each rod Ti includes a set of elementary light sources. According to one example, each LED is individually electrically pilotable. As such, the cell of a rod Ti can be shaded by piloting the set of the diodes of the light source.

According to one example, the rods can be gathered for being powered. In this case, a tangible screen can comprise different groups of rods, called modules. Each module can be associated to a calculator such as a microcontroller or a FGPA in order to supply and control the rods of the same group. In the latter case, an electronic component coordinates different electrical set points applied to the different modules. This configuration allows a distributed architecture to optimize the arrangement of parts and reduce power supply requirements. One interest is to make the tangible screen of the invention modular to allow better maintenance.

FIG. 14A represents a first group G1 of diodes distributed on 4 rods Ti. This example illustrates that the rods Ti can be driven in a translational motion according to image information such as a depth piece of data. Such a piece of data can be obtained using a depth map associating each pixel to a depth piece of data. This piece of data can, for example, be obtained by using two images. For example, rods that include an LED of group G1 can be positioned at different stroke lengths.

Groups G2 and G3 illustrate two other cases in which diodes including the same colorimetric information are nevertheless positioned at different lengths.

Alternatively to the depth piece of data, the rods Ti can also be driven by another piece of data extracted from an image, such as a piece of metadata describing a shape of the image, specific zones or contours of a shape. This can be an outline of a shape obtained by analyzing a regular difference in contrast or lightness of zones in the image.

According to one embodiment, a shape detection algorithm can be performed. Thus, it is possible to dissociate depth effects mobilizing rod kinematics and color effects by individually controlling the diodes.

FIG. 14B represents a cross-section view along the axis A-A' of FIG. 14A, illustrating 4 rods Ti deployed at different lengths. Each rod is provided with a cell in which only the first 4 LEDs are represented.

In one example, the LEDs in a cell will receive an individualized color pilot set point. Thus, a cell will include LEDs with different colorimetric states to produce color effects, shades and any other effect for improving the aesthetic appearance of the display. In this case, it is a set of diodes in a cell that forms a voxel for an observer who will observe a 3D effect.

According to other configurations, the cells include several dozen LEDs, for example, 48 LEDs per cell.

According to one example, an artificial intelligence algorithm, that is "machine learning", is used to generate a pilot set point for the rods from a piece of data extracted from an image. For example, a neural network can be trained so as to recognize shapes and detect contour lines.

An example of application is the generation of a three-dimensional effect by associating a shape of an object represented on an image with the animation of a set of rods Ti corresponding to the shape of the object. According to another example, a depth map can also be used to obtain 3D effects. According to another configuration, each pixel can be associated to a plurality of rods Ti. As such, the command for animating a rod Ti related to a pixel is the same for the other rods Ti related to the same pixel.

All configurations of associations between pixels and rods Ti are possible, especially depending on the definition of the image 8 and the number of rods Ti.

According to one embodiment, a step of resizing or adapting the image to the size of structure 1 is performed. In the exemplary case of FIG. 9, the image comprises 38×23 pixels. If structure 1 includes a square distribution including for example 100×100 rods, an adaptation can be performed in order to associate a distribution of rods adapted to a distribution of pixels in the two dimensions of the image.

When the image includes gray levels or a wide color gamut, a configuration can be defined between the stroke of each rod Ti and the level of hue, saturation or lightness of each pixel in image 8.

The color of the diode and the stroke of the rod Ti can be associated with ranges of resolution of each pixel of an image. According to one example, a correspondence table can be configured between RGB codes and a {RGB; stroke}$_1$ pair of the structure.

According to one exemplary embodiment, an animation can be configured by programming durations in which the rods Ti are held in a given position. By way of example, an animation for varying some pixels of image 80.

Use of a Deformable Surface

Figure 11:
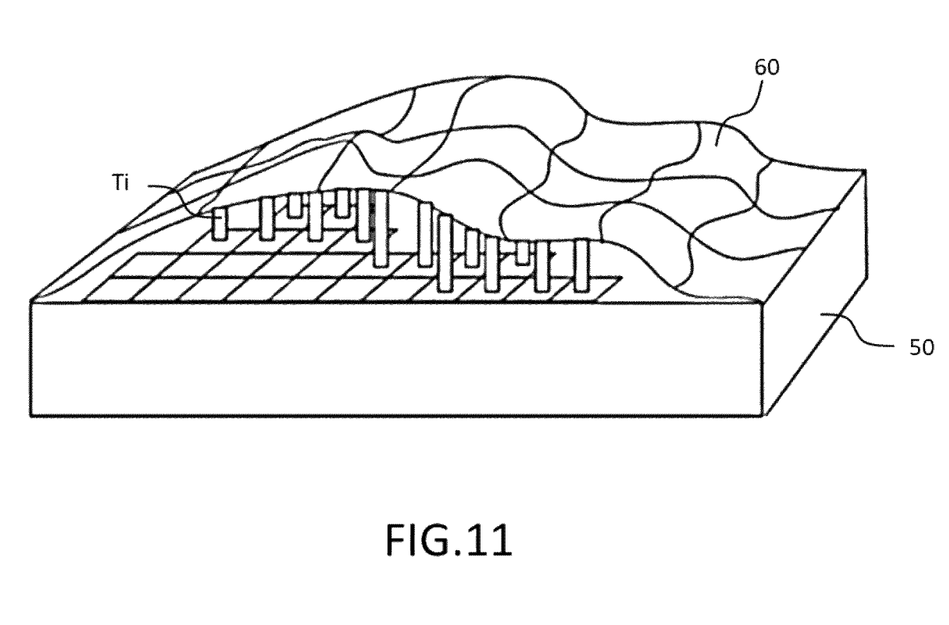
FIG. 11: a structure of the invention including a screen defining a deformable surface.

According to one embodiment, displaying an image is ensured by a deformable surface 60 the deformations of which are driven by the motions of the rods Ti. FIG. 11 illustrates an exemplary embodiment of such a deformable surface 60 forming an extensible skin. The deformable surface 60 is thereby a removable screen allowing a volume effect to be added to the displayed image. The device of the invention can be advantageously integrated into a frame 50 adapted to form a screen support including for example means for attaching to a facade.

In this case, the diodes can be integrated either at the end of each of the rods Ti or in the thickness of the deformable surface 60. When the light source is arranged in the thickness of the screen defining the deformable surface 60, the latter can be advantageously made of transparent material. According to another embodiment, the LEDs can be arranged on the surface of the screen 60. In this case, the screen is not necessarily transparent since the LEDs directly light the observer's field of view.

According to another embodiment, the image can be displayed by rear projection on the screen. In this embodiment, a projection device is arranged to project an image onto the deformable surface forming the screen. According to one embodiment, an association is made between the stroke of each rod Ti and the color of a region of the image including at least one pixel.

According to this embodiment, and according to one example of implementation, the projected image may include a deformation for compensating for deformations of the image due to stretching of the deformable surface. 60 For this, the image used to generate a pilot set point Cpil of the rods Ti can also be used to calculate local correction factors to be applied to the projected image so that once projected it is faithful to the image that would have been projected on a non-deformed surface.

These solutions both allow display by controlling the light rendering for each pixel and by the controlled mobility of each rod Ti.

When a deformable surface 60 is used, the reproduction or generation of the three-dimensional shape is activated by the deformation of said surface 60 using rods Ti that are translationally moved by means of the drive devices 30.

In this case, the heads of the rods Ti exert a pressure force on the deformable surface 60 forming the visualization interface. According to one exemplary embodiment, the rods Ti exert an axial force on the display interface. According to other examples, other angle configurations with an interface can be contemplated.

According to one embodiment, EM heads of rods Ti with hemispherical rubber tips allow the interface to be deformed without damaging it.

A possible application of the invention is the production of screen support for the generation of video images to produce interactive animations. According to one example, media supports can be made to produce interactive urban supports. According to one embodiment, the device of the invention includes a means of attachment to a glass, concrete or plastic surface. According to one exemplary embodiment, the screen support of the invention includes a communication interface for receiving images coming from an image broadcast system.

Method

According to another aspect, the invention relates to a method for generating a three-dimensional image formed by a tangible structure 1 including a plurality of rods Ti arranged in parallel to each other. Structure 1 includes means for guiding each of the rods Ti, for example, by means of a previously described structure 1.

Figure 10:
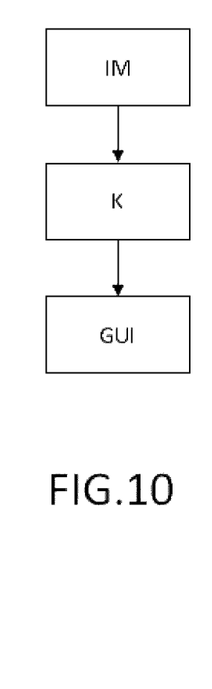
FIG. 10: the main steps of one embodiment of the method of the invention.

FIG. 10 represents the main steps of the method of the invention.

The method includes a first step of receiving IM an image. The image IM is, for example, a black and white image or a colorimetric image. The image IM can be defined in a .jpeg or .tiff format or any other image format. The image IM can be extracted from a video file. Thus, the method can be repeated for a succession of image IMs coming from a video file in order to animate the tangible structure for a period of time. One advantage is to produce interactive dynamic effects.

According to one embodiment, calculation steps can be performed by one K-calculator or several calculators. The calculations can correspond to the calculation of the images to be extracted or to the calculation of the strokes of each rod according to a pilot set point Cpil.

The method includes a step of extracting image properties, especially image pixels. The properties can relate to hue, lightness and saturation or RGB code depending on the definition frame of reference used for an image.

According to one embodiment, the method includes a step for automatically determining zones of the image having common properties especially relating to pixels. According to another example, the calculation is carried out for each pixel independently of the others.

The method includes a memory with a predefined configuration that associates a predefined rod stroke with a group of pixel properties.

According to one embodiment, the configuration includes an association between pixel properties within a predefined range and a piece of data relating to the length of a stroke. According to the size of the structure including the number of rods Ti and their length and the image size, different configurations can be used.

According to one embodiment, depending on the ratio: number of pixels/number of rods, an association configuration is automatically taken into account by the method. A ratio table can be stored in a memory in order to optimize the association between pixels and rods.

The method includes determining a set of stroke indicators, each indicator being associated with a given rod for a given period of time. According to one embodiment, the stroke indicator determines the portion of the rod Ti that is held protruding beyond a plate 115 or 116. Another reference can be defined to define the protruding part of the rod Ti. According to one embodiment, the stroke indicator defines a time indicator corresponding to the time instant from which the rod Ti is held in its position.

The method includes a guide GUI for moving the rods Ti to a point corresponding to a position deduced from the pilot set point Cpil and thus the digital set point C1.

Time indicators can thereby be used to hold the rods Ti in a position according to the direction of translation from their starting position. According to one embodiment, the rods move at a constant speed and holding of a rod according to a time indicator can be activated in the same time frame. Motor 31 stops driving motor shaft 310, which in turn no longer drives drive shaft 33, which in turn stops rotating roller 34. The rod is then in a reached position and can remain in this position until the motor receives a new pilot set point Cpil. As such, the three-dimensional image produced by the rods Ti restores an aspect of a given image IM from which properties have been extracted.

The method includes activating a light set point $C_{LUM}$ simultaneously with stopping each stroke of the rod Ti, for generating a corresponding image in addition to the three-dimensional shape. The light set point $C_{LUM}$ for lighting each diode can alternatively be generated at the same time instant for all rods Ti independently of the point at which the position associated with the set point is reached in order to coordinate lighting simultaneously at each end of the rods Ti regardless of the stroke to be performed.

According to another example, the light set point $C_{LUM}$ is emitted for a predefined period of time, e.g. a few ms, before reaching a position to be reached by the rod Ti.

According to one embodiment, the pilot set point Cpil is generated according to input data, called first digital set point C1. The first digital set point C1 can take different forms according to the applications of the invention.

According to a first example, the first digital set point C1 can be at least one binary piece of data such as the information of the color of a traffic light.

According to a second example, the first digital set point C1 corresponds to pixel values of a digital image IM and/or a pixel distribution of said image IM. In this case, displaying animated images can be made. When structure 1 of the invention includes diodes controlled by a light set point $C_{LUM}$, structure 1 allows a three-dimensional shape to be animated. Advantageously, the pilot set point Cpil and the light set point $C_{LUM}$ are processed together by the K calculator in order to coordinate the three-dimensional animation and colorimetric animation of the displayed image.

According to a third example, the first set point C1 is a digital information including text and/or numbers. For example, the digital information can correspond to the arrival time of a bus. This information can then be interpreted by a blind person.

The invention is compatible with any type of information input in order to generate a pilot set point Cpil enabling the drive device to be activated to activate an engine speed associated therewith. The input information can also be used to generate a light set point $C_{LUM}$ to the diodes.

The first set point C1 can be received by means of a wired or wireless communication interface or can be pre-recorded in a memory present in the structure of the invention.

Applications for Advertising and Event Media

One advantage of the method of the invention is to generate three-dimensional images, for example, to form building facades or advertising media.

Different embodiments can be contemplated especially regarding the choice of the dimensions of the tangible structure 1 to be implemented, length and cross-section area of the rods Ti, animation speed and use of light sources.

According to the choices made, the tangible structure 1 of the invention may define structures for different uses. According to a first embodiment, the structures 1 are of small dimensions to generate local single-user experiences such as interactive animations on screens in hotel rooms or cabins. According to another embodiment, the structures are of large dimensions, and can form interactive surfaces causing a collective animation experience. They can be animated event media or image-generating media or even building facades.

Applications for Rapid Prototyping

According to one embodiment of the invention, the device of the invention can be used to manufacture a three-dimensional surface of thermosetting type material. An interest is to rapidly make prototypes having a three-dimensional surface to be made, for example a surface defining a mannequin. The invention is particularly applicable to rapid prototyping uses. In this embodiment, the material is arranged on the device and is deformed by the motions of the rods Ti which are guided for example from a pilot set point Cpil. The pilot set point Cpil can, for example, be generated from an analysis of a digital or analog image that will be digitized. The image can be a three-dimensional image or a two-dimensional image.

The device therefore generates a movement of the rods Ti to form a three-dimensional image. The material in contact with the rods is deformed, for example, by plastic deformation or reversible deformation to take the three-dimensional shape imposed by the stroke of each rod. The three-dimensional surface is therefore deformed by stretching.

The thermosetting material is then heated. For this purpose, a heat activation means can be automatically activated when the rods are arranged in some position after the translational motion. Alternatively, the activation means is manually activated after an operator has checked the correct arrangement of the rods Ti and the deformation of the material beforehand. The settings can, for example, correspond to a temperature level and a temperature application time.

According to one embodiment, the material forming the three-dimensional surface is heated by a heating means for reaching a global temperature at the surface of the material necessary to cause the polymerization of the material. The material is then cooled, either naturally or by means of a device generating a temperature on the surface of the material below a given threshold.

According to one embodiment, the heating means is disposed at the ends of each rod Ti. The thermosetting material is then locally heated to the extent that the surface polymerizes locally and sufficiently to give a rigid appearance to the structure. In order to transfer heat to the end of the rod, an electrical wire can be integrated into the rod. An insulating sheath can, for example, insulate the electrical wire from the plastic material of the rod. When the rod Ti is made of metal material, heat can be directly transferred through the rod Ti.

The materials used can be those obtained by copolymerizing styrene in the presence of a reactive unsaturated polyester, aminoplast and epoxy resins, vulcanized elastomers, etc.

One interest is to allow applications for rapid prototyping such as vacuum forming and molding of mechanical parts.

An example of application may relate to the production of three-dimensional surfaces that are difficult to mold such as a portion of a human body or the envelope of a limb. These can be used, for example, in training exercises for surgeons. In this case, an MRI, a scanner or an image of a body can be used to generate a pilot set point Cpil for the rods Ti.

According to another example, the production of "custom-made" masks or surface molds can be ensured by means of the device of the invention.

Other applications can be contemplated to produce objects with specific three-dimensional shapes from the device of the invention.

Applications for Blind Persons

According to another use of the device, it can be configured to define tactile surfaces for blind people. By way of example of embodiment, the device of the invention can define interactive media for blind persons allowing to deliver information, such as a price, an indication that a light is red or green, a bus schedule in a station, a restaurant menu or any other type of information that could be displayed in an urban environment or at home. To this end, the device of the invention can be controlled by receiving a pilot set point Cpil from the rods Ti which is generated by the interactive device delivering the information such as a red light or a bus schedule. For this purpose, according to one embodiment, the device of the invention comprises a Bluetooth or Wifi type wireless communication interface so as to be paired with a third party device that can emit information such as binary information, text, image or sound.

According to another application for a blind person, the tangible structure 1 of the invention makes it possible to provide a tactile animation to accompany an audio story, for example, read aloud to be heard. Three-dimensional shape generation can then replace the visible image to illustrate a story. The structure can then be, for example, roughly the size of a digital tablet.

According to another application, the structure of the invention can provide an educational experience to discover shapes such as flowers or any other object.

According to one application, the tangible surface of the invention is used to move objects. The movement of the rods is then actuated according to a set point allowing a surface with slopes and rises, bottlenecks or flared shapes to be defined.

The invention claimed is:

1. A tangible structure, comprising:
   a set of movable and parallel rods, each rod including a head;
   a set of drive devices, each drive device including a motor element generating a rotational movement to a transverse shaft to transmit a translational motion to a rod, said drive device being piloted in order to transmit a motion to the rod at a given speed and in a given direction;
   a holding system for the drive devices making said drive devices integral with each other, and
   a calculator arranged to determine a set of pilot set points, each pilot set point being transmitted to a drive device based on a first digital set point;
   wherein the first digital set point is:
   at least one digital piece of data, or
   pixel values of a digital image and/or a pixel distribution of said image, or
   digital information including text and/or numbers.

2. The tangible structure according to claim 1, wherein each drive device of the set of drive devices comprises a pressure element driven by the motor element in turn driving a rod of the set of movable and parallel rods by friction.

3. The tangible structure according to claim 2, wherein the pressure element is a roller.

4. The tangible structure according to claim 1, wherein each drive device of the set of drive devices comprises a bevel gear system including two gear wheels allowing transmission of a rotation of the drive shaft to a rotation of a transverse shaft, said rotation of the transverse shaft causing rotation of a roller, said roller being secured to the transverse shaft.

5. The tangible structure according to claim 1, wherein the rods are made of a polymeric material.

6. The tangible structure according to claim 1, wherein each drive device is integrated into a frame of substantially parallelepipedal shape and including two guides each including an opening adapted to receive a rod in order to direct translational motions of a rod, said rod passing through said frame.

7. The tangible structure according to claim 1, wherein the rods are provided at their ends with an elastic head formed by a material among which: {elastomer, polymer, resin}.

8. The tangible structure according to claim 1, comprising a deformable surface, the deformation of which is driven by the rods, each of the heads of which is in contact with said surface.

9. The tangible structure according to claim 1, wherein:
the holding system is a plate including a plurality of openings, each opening allowing a rod to pass therethrough,
and wherein the tangible structure includes a second guide plate having a plurality of openings and parallel to the first plate and spaced apart by a predefined distance for sandwiching the drive devices, said second plate being arranged such that each rod passes through both plates.

10. The tangible structure according to claim 1, further comprising a plurality of light sources, said light sources being controlled by a light set point, each of the light sources being arranged:
at one end of a head of a rod, or
in a thickness of a deformable surface,
the calculator coordinating generation of the pilot set point with generation of the light set point from a same first digital set point.

11. The tangible structure according to claim 1, further comprising a heating source and a means for activating heat to be applied to a material arranged in contact with the ends of the rods.

12. A method for manufacturing a three-dimensional object, comprising:
positioning and holding a thermosetting material on a tangible structure according to claim 11;
activating the tangible structure by a rod pilot set point in order to form a three-dimensional shape deforming the thermosetting material held at the end of each rod;
activating a source of heating of the thermosetting material beyond a predefined temperature threshold allowing the thermosetting material to polymerize, and
cooling and removing the material.

13. A method for generating a three-dimensional shape by activating a plurality of rods of a tangible structure, said rods being arranged in parallel to each other, said tangible structure including
a set of movable and parallel rods, each rod including a head;
a set of drive devices, each drive device including a motor element generating a rotational movement to a transverse shaft to transmit a translational motion to a rod, said drive device being piloted in order to transmit a motion to the rod at a given speed and in a given direction;
a holding system for the drive devices making said drive devices integral with each other, and
a calculator arranged to determine a set of pilot set points, each pilot set point being transmitted to a drive device based on a first digital set point;
said method comprising:
receiving an image made by a communication interface or a memory of the structure;
calculating a plurality of stroke indicators for a plurality of sets of pixels of the image, each stroke indicator being calculated for a given rod of the structure depending on the properties of each set of pixels;
guiding the set of rods by means of each drive device, said drive devices each generating a motor set point from a pilot set point deduced from the stroke indicators, each pilot set point further generating an electrical set point each piloting a light source arranged at the end of each rod and activating a property of the light emitted by each of them.

* * * * *